(12) United States Patent
Rule et al.

(10) Patent No.: US 11,172,355 B2
(45) Date of Patent: *Nov. 9, 2021

(54) TECHNIQUES FOR CALL AUTHENTICATION

(71) Applicant: Capital One Services, LLC, McLean, VA (US)

(72) Inventors: Jeffrey Rule, Chevy Chase, MD (US); Gaurang Bhatt, Herndon, VA (US); Rocky Guo, Falls Church, VA (US); Lukiih Cuan, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/849,429

(22) Filed: Apr. 15, 2020

(65) Prior Publication Data

US 2021/0021991 A1    Jan. 21, 2021

Related U.S. Application Data

(63) Continuation of application No. 16/656,232, filed on Oct. 17, 2019, now Pat. No. 10,667,128, which is a (Continued)

(51) Int. Cl.
*H04W 12/00* (2021.01)
*H04W 12/06* (2021.01)
(Continued)

(52) U.S. Cl.
CPC ....... *H04W 12/003* (2019.01); *H04W 12/001* (2019.01); *H04W 12/0609* (2019.01);
(Continued)

(58) Field of Classification Search
CPC ........... H04W 12/003; H04W 12/0609; H04W 12/1008; H04W 12/12; H04W 12/001; H04M 3/493

See application file for complete search history.

(56) References Cited

U.S. PATENT DOCUMENTS

| 2012/0109735 A1* | 5/2012 | Krawczewicz .. G06K 19/07703 705/14.27 |
| 2014/0208112 A1* | 7/2014 | McDonald .......... H04L 63/0435 713/171 |

(Continued)

FOREIGN PATENT DOCUMENTS

WO    2018004935 A1    1/2018

OTHER PUBLICATIONS

International Search Report and Written Opinion of International Patent Application No. PCT/US2020/042062 dated Sep. 15, 2020, 10 pages.

Primary Examiner — Nizar N Sivji
(74) Attorney, Agent, or Firm — Kacvinsky Daisak Bluni PLLC

(57) ABSTRACT

Various embodiments described herein are directed towards authenticating calls by using one or more keys associated with a specific user. In examples, the user is the sender of a call. In various embodiments, when a call is made, an identifying payload is encrypted using a private key associated with the user. The encrypted identifying payload is appended to the call data stream. The identifying payload may be decrypted with a public key. In embodiments, the identifying payload may be verified. In various embodiments, further authentication methods may be performed by using an object such as a contactless card to provide one or more components of the identifying payload and/or keys. In embodiments, a connection may be made between the sender and the intended recipient of a call based on the verification of the identifying payload.

17 Claims, 7 Drawing Sheets

Related U.S. Application Data continuation of application No. 16/517,074, filed on Jul. 19, 2019, now Pat. No. 10,506,426.

(51) Int. Cl.
*H04W 12/10* (2021.01)
*H04W 12/12* (2021.01)
*H04M 3/493* (2006.01)

(52) U.S. Cl.
CPC ....... *H04W 12/1008* (2019.01); *H04W 12/12* (2013.01); *H04M 3/493* (2013.01)

(56) References Cited

U.S. PATENT DOCUMENTS

| | | | |
|---|---|---|---|
| 2015/0088674 A1* | 3/2015 | Flurscheim | G06Q 20/3274 |
| | | | 705/17 |
| 2015/0094026 A1 | 4/2015 | Martin | |
| 2015/0100499 A1* | 4/2015 | Dua | G06Q 20/20 |
| | | | 705/76 |
| 2015/0236857 A1 | 8/2015 | Feltham et al. | |
| 2015/0372811 A1* | 12/2015 | Le Saint | H04L 63/068 |
| | | | 705/76 |
| 2016/0065370 A1* | 3/2016 | Le Saint | H04L 9/0841 |
| | | | 713/155 |
| 2016/0379217 A1* | 12/2016 | Hammad | G06Q 20/4018 |
| | | | 705/75 |
| 2017/0154328 A1* | 6/2017 | Zarakas | G06K 19/07707 |
| 2019/0238517 A1* | 8/2019 | D'Agostino | H04L 63/0807 |
| 2019/0260732 A1* | 8/2019 | Narayan | G06Q 20/0855 |

* cited by examiner

TECHNIQUES FOR CALL AUTHENTICATION

RELATED APPLICATIONS

This application is a Continuation of U.S. patent application Ser. No. 16/656,232, entitled "TECHNIQUES FOR CALL AUTHENTICATION" filed on Oct. 17, 2019, which is a Continuation of U.S. patent application Ser. No. 16/517,074, entitled "TECHNIQUES FOR CALL AUTHENTICATION" filed on Jul. 19, 2019 (issued as U.S. Pat. No. 10,506,426 on Dec. 10, 2019). The contents of the aforementioned applications are incorporated herein by reference in their entireties.

BACKGROUND

Unsolicited phone calls present an annoyance and a security risk for call recipients. Recipients may be subject to nuisance calls such as telemarketing calls, prank calls, and/or silent calls. Unsolicited calls may also be used to initiate telephone frauds, wherein imposters pose as legitimate entities in an attempt to steal information or funds.

Telephone call authentication involves attempting to identify a calling party. However, current methods lack the ability to reliably authenticate the devices called from and the parties calling from them. Furthermore, such methods are at best sparsely implemented and subject to practices such as spoofing, in which a caller may use a false identity and/or number in order to trick a call recipient into answering. As a result, users often have a mistrust of communication systems at best. At worst, they may be subject to nuisances and/or security risks.

SUMMARY

According to one aspect of the invention, a method for performing peer to peer authentication of calls includes the steps of receiving an incoming call data stream from a first mobile phone device, the incoming call data stream comprising an incoming call number of a second mobile phone device and an encrypted payload comprising payload data encrypted using a private key associated with the first mobile phone device. In some embodiments, the private key comprises a dynamic key of the first mobile phone device and the encrypted payload comprises a cryptogram. The method may include authenticating the incoming call data stream in response to a match between the encrypted payload and stored information related to the first mobile phone device. In various aspects, the authentication includes forwarding the cryptogram to an authentication server, wherein the authentication server maintains and modifies a copy of the dynamic key concurrently with the first mobile phone device as the stored information related to the first mobile phone device. In some embodiments, the authentication further includes receiving a validation of the first mobile phone device from the authentication server in response to a counter match between a counter extracted from the cryptogram using the copy of the dynamic key and an expected counter associated with the first mobile phone device. The method may further include selectively establishing a call connection between the first mobile phone device and the second mobile phone device in response to the step of authenticating.

According to another aspect of the invention, a system for authenticating calls between devices comprises an interface configured to receive an incoming call data stream from a first mobile phone device. In some embodiments, the incoming call data stream comprises an incoming call number associated with a second mobile phone device and an encrypted payload comprising payload data encrypted using a private key associated with the first mobile phone device. In some embodiments, the system includes a processor coupled to the interface and a non-volatile memory having program code stored thereon, the program code operable when executed upon by the processor to authenticate the incoming call data stream in response to a match between information of the encrypted payload and stored information related to the first mobile phone device. The system further includes a communication interface coupled to the processor and configured to selectively establish a call connection between the first mobile phone device and the second mobile phone device in response to the step of authenticating.

According to yet another aspect of the invention, a method for authenticating calls between mobile devices includes the steps of receiving an incoming call data stream from a first mobile phone device. In some embodiments, the incoming call data stream comprises an incoming call number associated with a second mobile phone device, and an encrypted payload comprises payload data encrypted using a private key associated with the first mobile phone device and a voice message an attribute. The method includes retrieving a public key of the incoming call number from a data storage device and decrypting the encrypted payload using the public key of the incoming call number to produce a decrypted payload comprising an identifier. The method includes comparing the identifier of the decrypted payload to an expected identifier associated with the incoming call number to determine a first factor authentication match and comparing the attribute of the voice message to an expected voice message attribute to identify a second factor authentication match. The method further includes selectively establishing a connection between the first mobile phone device and the second mobile phone device in response to the first factor authentication match and the second factor authentication match.

With such an arrangement, a system and method are provided for reliably authenticating incoming calls.

DETAILED DESCRIPTION

Figure 1:
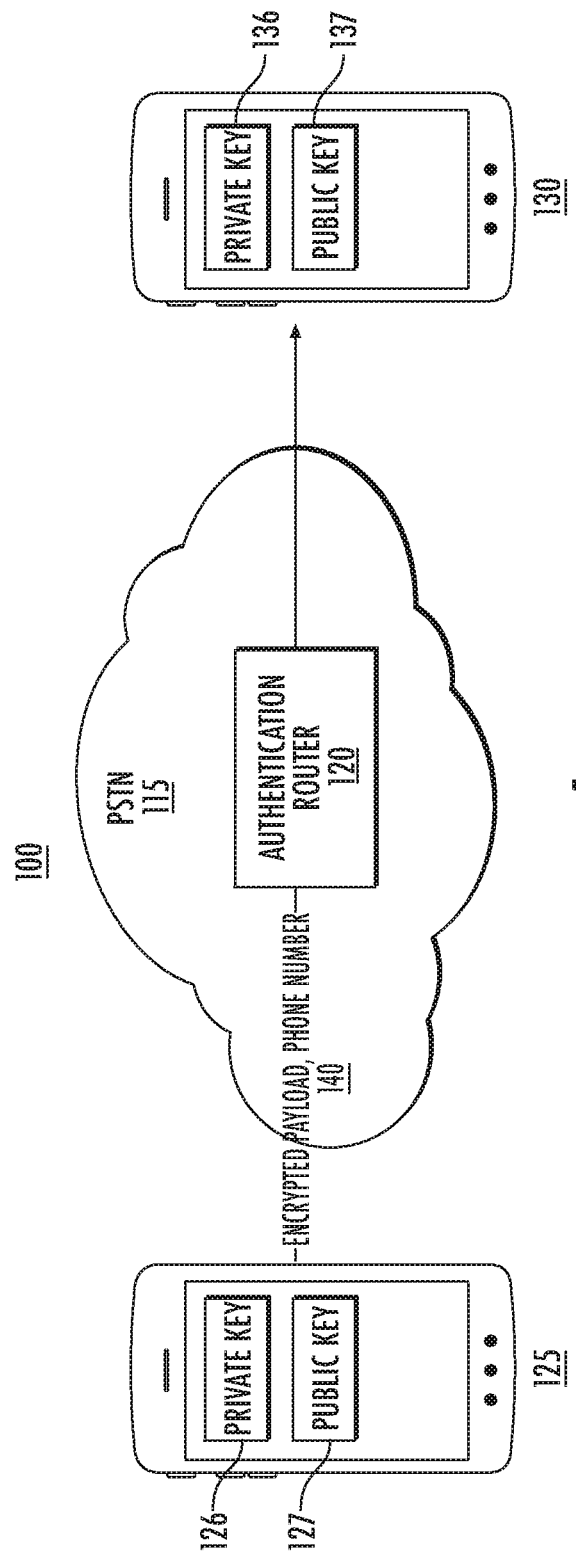
FIG. 1 is a first block diagram of a data transmission system configured to authenticate user calls according to an example embodiment.

An objective of some embodiments of the present disclosure is the use of one or more keys that have been incorporated into one or more contactless cards as described in U.S. patent application Ser. No. 16/205,119 filed Nov. 29, 2018 by Osborn, et. al, entitled "Systems and Methods for Cryptographic Authentication of Contactless Cards" and incorporated herein by reference (hereinafter the '119 application). The contactless card may be used to perform authentication and numerous other functions that may otherwise require the user to carry a separate physical token in addition to the contactless card. By employing a contactless interface, contactless cards may be provided with a method to interact and communicate between a user's device (such as a mobile phone) and the card itself. For example, the near-field communication (NFC) protocol, which underlies many credit card transactions, includes an authentication process which suffices for operating systems for Android® but presents challenges for iOS,®, which is more restrictive regarding NFC usage, as it can be used only in a read-only manner. Exemplary embodiments of the contactless cards described in the '119 application may utilize NFC technology. Authenticating users via the contactless card interface may overcome prior art identity theft issues by validating endpoints of a call link.

Various embodiments described herein are directed towards authenticating calls by using one or more keys associated with a specific user. In examples, the user is the sender of a call. In various embodiments, when a call is made, an identifying payload is encrypted using a private key associated with the user. The encrypted identifying payload is appended to the call data stream. The identifying payload may be decrypted with a public key. In embodiments, the identifying payload may be verified. In various embodiments, further authentication methods may be performed by using an object such as a contactless card to provide one or more components of the identifying payload and/or keys. In embodiments, a connection may be made between the sender and the intended recipient of a call based on the verification of the identifying payload.

In some embodiments described herein, the private key used to encrypt the identifying payload may be stored or issued with respect to a particular user device. Such a user device may be a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client device, a fat client device, or other device.

In some embodiments described herein, the private key used to encrypt the identifying payload may be stored or issued with respect to a separate object associated with the user. For example, the separate object may be a contactless card, as referenced in the incorporated '119 application and in greater detail herein. Embodiments are not limited in this context.

In various embodiments described herein, the identifying payload may comprise text data, audio data, numerical data, or a combination thereof. For example, an identifying payload may comprise information about a user's association with a communication service provider, a voice message, or a counter as associated with a contactless card. Embodiments are not limited in this context.

While unsolicited calls may come from a variety of callers with a variety of purposes, they are often difficult for a recipient to identify, leading to poor user experience for communication system clients and user mistrust of the communication system.

For example, caller ID may indicate to a call recipient that a caller is a known contact or show the caller's phone number so that the recipient may recognize an area code in it. However, caller ID can be turned off by the caller. Furthermore, in this example, the recipient is still notified of the incoming call and must still deliberately deny it. Furthermore, harassers can avoid proper identification, for example, by spoofing or blocking caller ID. In further examples, voice over IP users may send false caller ID or route calls through servers in multiple countries.

For the field of phone communications, the FCC has called for the implementation of Signature-based Handling of Asserted Information Using toKENs (SHAKEN) and the Secure Telephone Identity Revisited (STIR) standards, but these procedures also fall short of fully authenticating the identity of a caller. In SHAKEN/STIR, the service provider of a caller may create a digital signature based on what it knows about the call origination, such as the customer and their right to use the number called from, the customer (but not the number), or the point from which the call enters their network. An origination identifier may be assigned to uniquely identify the call origination. However, in these procedures, the end verification is that a caller has a right to appear as a certain calling party to the recipient. The call may not actually come from the number that appears as the caller. For example, service provider-approved spoofing may still take place. Even after the implementation of such methods, recipients will not have certainty of the identity on the other end of an incoming communication. There is a need for an improved system to authenticate identities of parties originating communication.

Various embodiments described herein include components that can enable one or more of the following: (1) authentication of a communication initiator in association with the device used to initiate the communication, (2) authentication of a communication initiator in association with the device used to initiate the communication and separate identifying information provided by and/or relating to the communication initiator, and (3) authentication of a communication initiator in association with the device used to initiate the communication and a separate object uniquely possessed by the communication initiator, for example, a contactless card.

Authentication of communications based on the device from which they were sent reduces the potential for nuisance communications, including fraud attempts, to reach a receiving client, thereby improving the security of their information. In some embodiments, selective connection of a first client device and second client device for communication-based on the results of the authentication or multifactor authentication may reduce the load of unwanted communications on clients and thereby improve client experience.

Embodiments disclosed herein thus leverage authentication features of at least one client device and/or service provider in practical applications to increase security of network communications and/or improve client confidence in the authenticity of received communications. In several embodiments, components described herein may provide specific and particular manners of authenticating communications and/or managing communications based on the results of authentication. In many embodiments, one or more of the components described herein may be implemented as a set of rules that improve computer-related technology by allowing a function not previously performable by a computer that enables an improved technological result to be achieved. For example, authenticating a communication based on identifying information related to the communication initiator is such an improved technological result. In another example, the function may include secure multifactor authentication via leveraging of features of a client device and/or separate object, such as a contactless card. In another example, the function may include managing communications by selectively connecting devices for communication according to the results of multifactor authentication.

These and other features of the invention will now be described with reference to the figures, wherein like reference numerals are used to refer to like elements throughout.

As used in this application, the terms "system", "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

FIG. 1 illustrates a system 100 including 2 or more client devices 125 and 130 coupled via a network 115. In various embodiments, a client devices 125 and 130 comprise network-enabled computers and communicate with each other via network 115. Specifically, various embodiments include each client device being associated with a private key and a public key. In embodiments, a client device 125 initiating communication may send a message 140 comprising a phone number and a payload encrypted with its own private key 126. The message may be passed through an authentication router 120 which is part of the network 115. The encrypted payload of the message 140 may be decrypted using the public key 127 associated with the client device 125. The communication may be passed to client device 130. Embodiments are not limited in this context.

In various embodiments, a first client device 125 may initiate a communication with the intention of reaching one or more client devices 130. While only one device is illustrated in FIG. 1, it will be understood that the communication could have a plurality of recipients, for example, as in a group message, conference call, or group video chat. Embodiments are not limited in this context.

The client devices 125 and 130 can include a processor and a memory, and it is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein. The client devices 125 and 130 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

One or more client devices 125 and 130 also may be a mobile device for example, such as an iPhone, iPod, iPad from Apple® or any other mobile device running Apple's iOS operating system, any device running Microsoft's Windows® Mobile operating system, and/or any other smartphone or like wearable mobile device.

Client devices 125 and 130 may include a thin client application specifically adapted for communication with a service provider. A service provider may be a business or other entity providing computer-related services over a network. The thin client application may be stored in a memory of the client device and be operable when executed upon by the client device to control an interface between the client device and a service provider application, permitting a user at the client device to access service provider content and services.

In embodiments, the client device 125 is associated with a private key 126 and a public key 127. The private key 126 and the public key 127 may be related so as to be able to encrypt and decrypt data, such as in symmetric key encryption or asymmetric key encryption (also known as public key encryption). In embodiments, the private key 126 and the public key 127 may be different, with the public key 127 being available to systems external to the client device 125 and the private key 126 intended only to be known by the client device 125. In such embodiments, the system 100 may be directed to use asymmetric key encryption. In some embodiments, the same public key may be available to and/or associated with multiple client devices, for example, with client device 125 and with the client device 130.

In various embodiments, the private key 126 may be persistent or static. In other embodiments, the private key may be a dynamic key. For example, a private key 126 may be a rolling key. A private key 126 may be changed, for example, as a function of time, of a counter, or other dynamic condition. In various embodiments, a counter by which a private key 126 is updated may be advanced by a client's use of the client device 125 or of a separate object, such as a contactless card as described in the '119 application and in more detail herein. It will be readily understood that a dynamic key may be updated in response to other events, changes in circumstance, and/or a combination of any described above.

In various embodiments, association of the private key 126 and/or the public key 127 with the client device 125 may be established at or before the issuance of the client device 125 to the client. For example, the keys may be set by a manufacturer of the device, by a service provider, or other entity. In other embodiments, the private key 126 and/or the public key 127 may be linked to the device later. For example, a client device 125 may receive updated keys 126 and 127. In various embodiments, the private key 126 and/or the public key 127 may be stored to memory on the client device 125 or to an external server or database. In various embodiments, the private key 126 and/or the public key 127 may be updated by using an application on the client device and/or by using a separate computer. For example, the private key 126 and/or public key 127 may be updated or diversified in accordance with dynamic data such as a counter. Such examples are found in the '119 reference, incorporated herein by reference.

The client device 125 may initiate communication with another client device 130 by generating a message 140. In embodiments, the message 140 may comprise an encrypted payload and a phone number. The encrypted payload may be encrypted using the private key 126. The phone number may comprise the phone number of the client device 125 and/or the client device 130. In embodiments, the payload encrypted as the encrypted payload of message 140 may comprise text, numerical, audio, other data, or a combination thereof. The payload may comprise uniquely identifying information for the client, the client device 125, or a combination thereof. Furthermore, the encrypted payload may contain hashed data. Such information may be stored in memory accessible to the client device 125, for example, local to the client device or accessible via a network connection. In various embodiments, the encrypted payload may comprise dynamic information relating to the client, the client device 125, or a separate object, for example, a contactless card as described in greater detail herein. Dynamic information may change with each communication sent by the client device 125 or at another rate. In some embodiments, the public key 127 may be included in the message 140.

In some embodiments, the encrypted payload and/or message 140 may be appended to a communication from the client device 125. For example, the encrypted payload may be appended to a call data stream. In some embodiments, a communication from the client device 125 may be included in the encrypted payload.

The message 140 may be sent from the client device 125. In various embodiments, the message 140 may pass through an authentication router 120. The authentication router 120 may be associated with a network 115.

In some examples, network 115 may be one or more of a wireless network, a wired network or any combination of wireless network and wired network and may be configured to connect client device 125 to service provider 320. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

Furthermore, it should be appreciated that according to one or more examples, network 115 may be part of a plurality of interconnected networks, such as, for example, the Internet, a service provider's private network, a cable television network, corporate networks, such as credit card association networks, and home networks. In some embodiments, the authentication router 120 and/or network 115 may be associated with a communication service provider. In addition, a private network may be implemented as a virtual private network layered upon network 115.

For example, network 115 may comprise a public switched telephone network (PSTN), and the authentication router may be associated with the communication service provider used by the client of client device 125 and/or client device 130.

The authentication router 120 may have access to the public key 127 associated with the client device 125. In some cases, the authentication router 120 may receive the public key 127 from the client device 125 via the message 140. In other embodiments, the authentication router 120 may have access to a database, table, or other storage or memory in which the public key 127 is stored. In these embodiments, the memory may be local to the authentication router 120 or otherwise available via the network 115.

In some embodiments, the authentication router 120 has access to storage as described above which includes dynamic information pertaining to the encrypted payload of the message 140. For example, dynamic information included in the encrypted payload may be reflected by the information available to the authentication router. For example, if the payload comprises current information about a client's account with a communication service provider, the memory may comprise separately maintained current information about the client's account with the service provider. In another example, if the encrypted payload comprises a counter that is increased each time a client uses the client device 125 to make a call, a counter may be updated in the memory accessible to the authentication router 120 each time the client device 125 makes a call.

Such information as pertaining to the client and/or client device 125 may be made initially available to the authentication router 120 upon activation of a client device 125 or issuance of a client device 125 to a client. Furthermore, such information should be associated with the client and/or client device. For example, a counter associated with a client device may be set to zero or some other predetermined number in response to activation of a device, or initial account information for a client may be entered by a communication service provider employee in response to account creation for the client. However, such information is updated independently from the content of the message 140.

In some embodiments, the public key 127 is stored in such memory accessible to the authentication router 120. In embodiments, the public key 127 may be entered with a memory location associated with the client and/or client device 125 upon the issuance of the client device 125 to the client and/or beginning of service by the communication service provider. If the public key is updated, for example, to match an updated private key, the public key 127 in the memory may be updated. In some embodiments, this update may be automatic. In other embodiments, this update may be performed in response to an event, for example, the sending of a message 140 from the client device 125. In some embodiments, the public key 127 may be updated in response to being received as part of a message 140.

In various embodiments, the authentication router 120 may decrypt the message 140 using the public key 127. In embodiments wherein the encrypted payload comprises hashed data, a hash function may be applied to the decrypted payload to extract information, for example, an identifier. In embodiments, contents of the decrypted payload of message 140 may then be compared to information known by the authentication router pertaining to the client and/or client device. For example, if the payload comprises a counter, that counter may be compared to the counter known by the authentication router. The matching of the information of the decrypted payload and the information known by the authentication router 120 allows for authentication of the message 140 as being genuinely sent from the client device 125.

As the public key 127 is related to the private key 126, which is known only to the client device 125, successful decryption of the message 140 using the public key 127 indicates that the message 140 was in fact sent from the client device 125. However, a mismatch between the encrypted payload of a message sent from a client device and the information available to the authentication router pertaining to the client and/or client device 125 may indicate nefarious activity. For example, a hacker or imposter may have gained access to the private key 126 of client device 125 and the message received by the authentication router may not be from the client device 125 as identified. In cases where an incoming message was unable to be decrypted using the public key 127 and/or the decrypted payload of the message could not be authenticated, the communication may be flagged for recipient client device 130. In some embodiments, the connection for the communication between client devices 125 and 130 may not be completed based upon such a failure of authentication. Information pertaining to the client device 125 and/or the message 140 may be flagged, stored in a database, and/or sent to the service provider or other entity, for example, law enforcement, based upon such failure of authentication. In some embodiments, client devices 125 and 130 may be connected for communication based upon successful authentication of the initiating client device 125.

In some embodiments, the client device 130 has an associated private key 136 and public key 137 of its own. It will be understood that these keys may allow for returned communication from client device 130 to client device 125 by the same methods described with respect to communications from client device 125 to client device 130.

In various embodiments, authentication processes may take place locally to recipient client device 130 as opposed to locally to an authentication router 120. Specifically, a message 140 may be routed by network 115 to client device 130 while still encrypted.

In such embodiments, the client device 130 may have access to the public key 127 associated with the client device 125. In some cases, the client device 130 may receive the public key 127 from the client device 125 via the message 140. In other embodiments, the client device 130 may have access to a database, table, or other storage or memory in which the public key 127 is stored. In these embodiments, the memory may be local to the client device 130 or otherwise available via the network 115.

In some embodiments, the client device 130 has access to storage as described above which includes dynamic information pertaining to the encrypted payload of the message 140. For example, dynamic information included in the encrypted payload may be reflected by information available to the authentication router. For example, if the payload comprises current information about a client's account with a communication service provider, the memory may comprise separately maintained current information about the client's account with the service provider. In another example, if the encrypted payload comprises a counter that is increased each time a client uses the client device 125 to make a call, a counter may be updated in the memory accessible to the client device 130 each time the client device 125 makes a call. In such an example, counters relating to client device 125 local to client device 125 and local to client device 130 may be updated specifically in response to communications between client device 125 and client device 130.

Such information as pertaining to the client and/or client device 125 may be made initially available to the client device 130 upon activation of a client device 125 or issuance of a client device 125 to a client. Furthermore, such information should be associated with the client and/or client device. For example, a counter associated with a client device 125 may be set to zero or other predetermined number in response to activation of the client device 125, or initial account information for a client may be entered by a communication service provider employee in response to account creation for the client. In this example, information may be stored in memory external to client device 130, such as a database located on a network server. However, such information is updated independently from the content of the message 140.

In some embodiments, the public key 127 is stored in such memory accessible to the client device 130. In embodiments, the public key 127 may be entered into the memory in association with the client and/or client device 125 upon the issuance of the client device 125 to the client and/or beginning of service by the communication service provider. If the public key is updated, for example, to match a rolling private key, the public key 127 in the memory may be updated. In some embodiments, this update may be automatic. In other embodiments, this update may be performed in response to an event, for example, the sending of a message 140 from the client device 125 to the client device 130. In some embodiments, the public key 127 may be updated in memory available to client device 130 response to being received as part of a message 140.

In various embodiments, the client device 130 may decrypt the message 140 using the public key 127. In embodiments, the decrypted payload of message 140 may then be compared to information known by the client device 130 pertaining to the client and/or client device. For example, if the payload comprises a counter, that counter may be compared to the counter known by the client device 130. The matching of the information of the decrypted payload and the information known by the client device 130 allows for authentication of the message 140 as being genuinely sent from the client device 125.

As the public key 127 is related to the private key 126, which is known only to the client device 125, successful decryption of the message 140 using the public key 127 indicates that the message 140 was in fact sent from the client device 125. However, a mismatch between the encrypted payload of a message sent from a client device and the information available to the authentication router pertaining to the client and/or client device 125 may indicate nefarious activity. For example, a hacker or imposter may have gained access to the private key 126 of client device 125 and the message received by the authentication router may not be from the client device 125 as identified. In cases where an incoming message was unable to be decrypted using the public key 127 and/or the decrypted payload of the message could not be authenticated, the communication may be flagged for recipient client device 130. In some embodiments, the connection for the communication between client devices 125 and 130 may not be completed or continued based upon such a failure of authentication. Information pertaining to the client device 125 and/or the message 140 may be flagged, stored in a database, and/or sent to the service provider or other entity, for example, law enforcement, based upon such failure of authentication. In some embodiments, client devices 125 and 130 may be connected for communication based upon successful authentication of the initiating client device 125.

Figure 2:
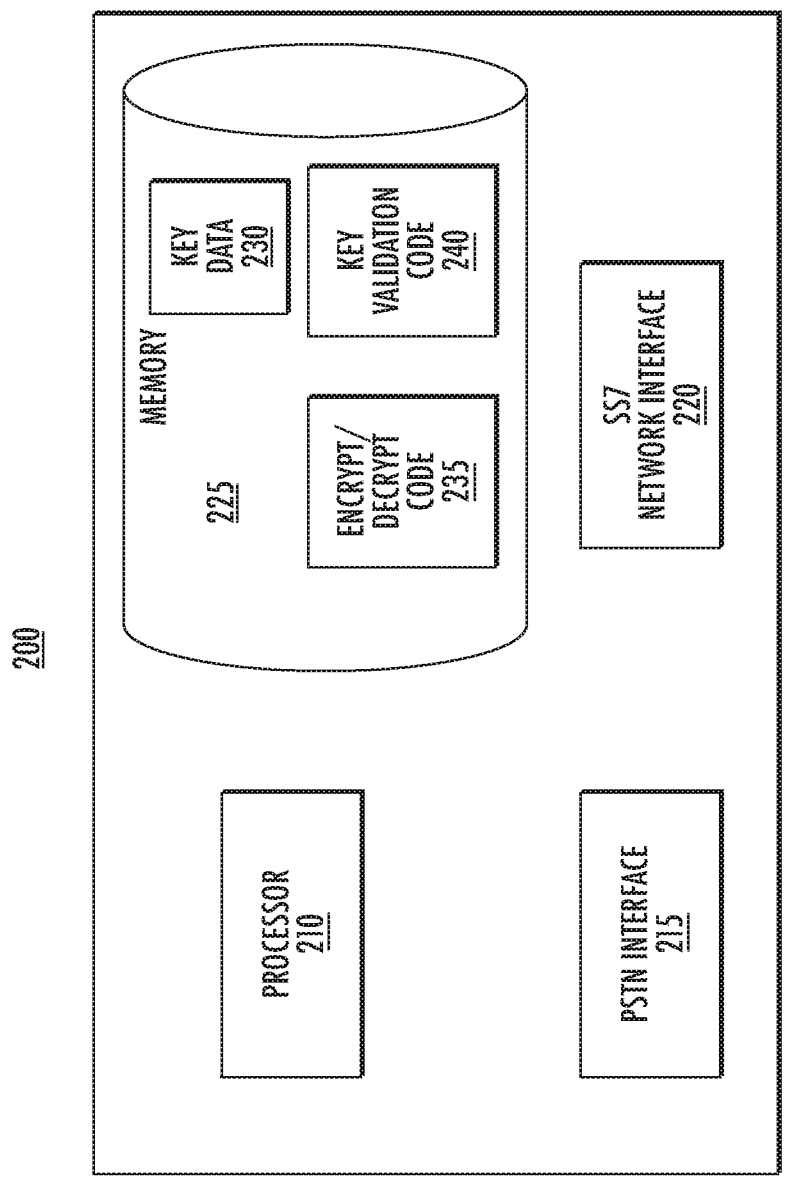
FIG. 2 is a detailed block diagram illustrating exemplary components that may be used in the system of FIG. 1.

FIG. 2 is a block diagram illustrating various exemplary components which may be useful for implementing methods such as discussed with respect to FIG. 1. System 200 may, for example, be implemented to allow encryption and/or decryption of data. As such, similar components may be implemented as client device 125, authentication router 120, and/or client device 130. System 200 is particularly directed to communications comprising phone calls. Embodiments are not limited in this manner.

In embodiments, system 200 may include a processor 210. It is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. Furthermore, the processor 210 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 210. Such a processor may enable a network-enabled device to communicate with other network-enabled devices via using a PSTN interface 215 managed by an SS7 network interface 220.

Specifically, the PSTN interface 215 allows the system 200 to connect with a network 115 and associated services. A signaling system no. 7 (SSN) network interface is used to manage the system's 200 use of the network 115 via the PSTN interface 215 by using a path and facility distinct from the voice channel to signal set up and release of a communication.

Memory systems such as those referenced with respect to the client device 125, authentication router 120, and client device 130 may be embodied as memory 225, in some examples. The memory 225 may be a read-only memory, write-once read-multiple memory or read/write memory, e.g., RAM, ROM, and EEPROM, and the system 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 225 may be configured to store one or more of key data 230, encrypt/decrypt code 235, and key validation code 240. Key data may comprise keys used to encrypt and/or decrypt information such as a message such as message 140, an identifying payload, or other information. For example, key data 230 may comprise a private key 126 and a public key 127.

Encrypt/decrypt code 235 may comprise code to encrypt and/or decrypt information such as a message such as message 140, an identifying payload, or other information using key data 230.

Key validation code 240 may comprise code to validate the encryption and/or decryption of information such as a message such as message 140, an identifying payload, or other information using the key data 230 according to the encrypt/decrypt code 235. In some embodiments, key validation code 240 may comprise a payload identifying the client and/or client device, for example, an identifying payload of message 140.

Figure 3:
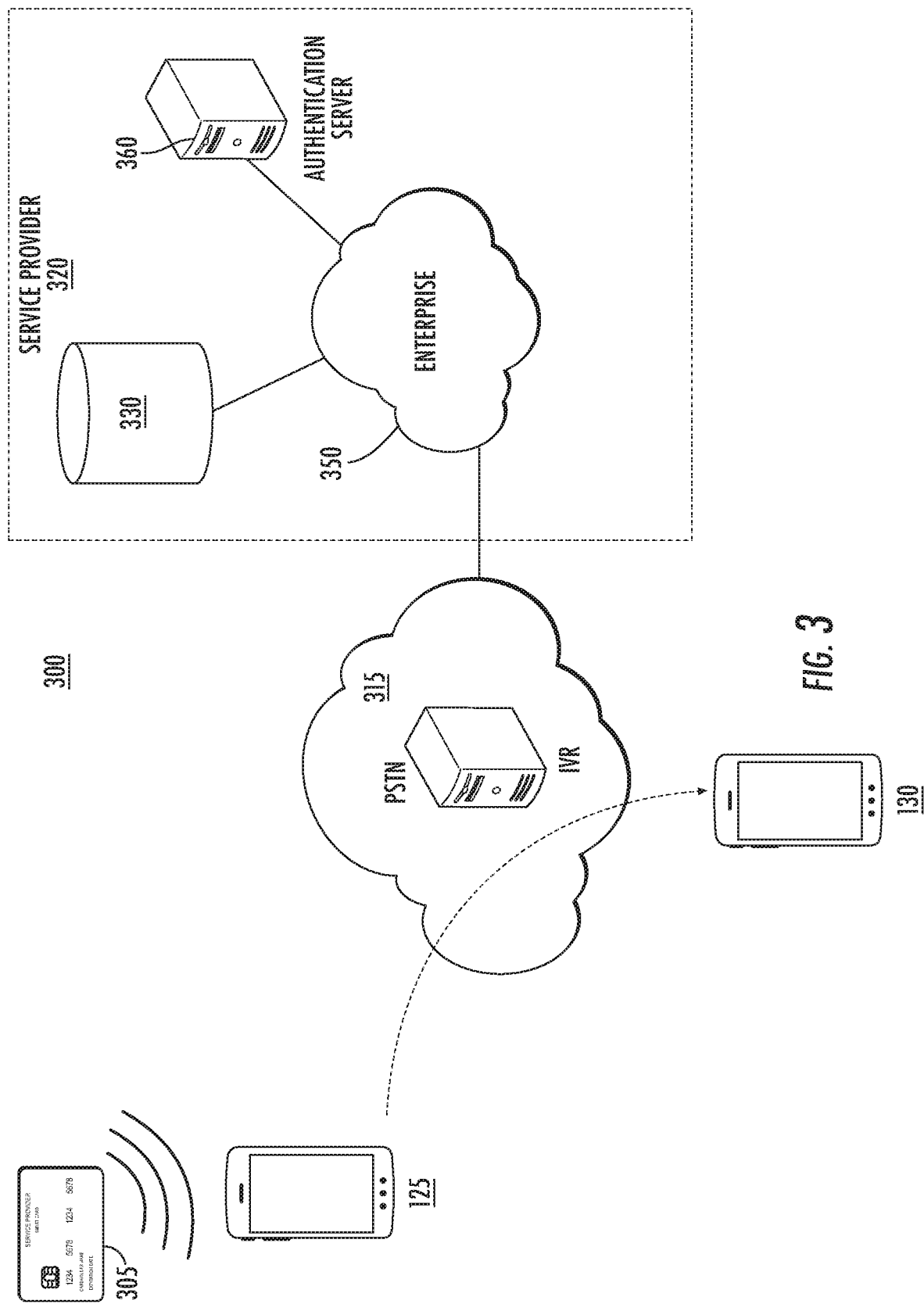
FIG. 3 is a detailed block diagram of components of the system of FIG. 1 that may be utilized to support aspects of the invention.

FIG. 3 is a block diagram illustrating a system 300 in which a client device 125 is coupled via a network 315 to a service provider 320. Embodiments are not limited in this manner.

The service provider 320 is, in one embodiment, a business providing computer-based services to clients over a network 115. Almost all modern service providers use the internet to provide service offerings to potential consumers. The service offerings are generally provided in the form of software applications which operate using dedicated resources of the service provider. The combination of the software and hardware that provides a particular service to a client is referred to herein as a 'server.' The servers may communicate over a private network 350 of the service provider, often referred to as a corporate or enterprise network. The private network 350 may comprise a wireless network, a wired network or any combination of wireless network and wired network as described above with regard to network 115.

In system 300, service provider 320 is shown to include an authentication server 360. Although the server is illustrated as a discrete device, it is appreciated that the applications and servers may be distributed throughout the enterprise or, in the case of distributed resources such as 'cloud' resources, throughout the network 115.

Database 330 comprises data storage resources that may be used, for example, to store customer account, credential and other authentication information for use by the authentication server 360. The database 330 may be comprised of coupled data resources comprising any combination of local storage, distributed data center storage or cloud-based storage.

A contactless card 305 may comprise a payment card, such as a credit card, debit card, or gift card, issued by a service provider 320 displayed on the front or back of the card 305. In some examples, the contactless card 305 is not related to a payment card, and may comprise, without limitation, an identification card. In some examples, the payment card may comprise a dual interface contactless payment card. The contactless card 305 may comprise a substrate, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 305 may have physical characteristics compliant with the ID-1 format of the ISO/IEC 7810 standard, and the contactless card may otherwise be compliant with the ISO/IEC 14443 standard. However, it is understood that the contactless card 305 according to the present disclosure may have different characteristics, and the present disclosure does not require a contactless card to be implemented in a payment card.

The contactless card 305 may also include identification information displayed on the front and/or back of the card, and a contact pad. The contact pad may be configured to establish contact with another communication device, such as a user device, smart phone, laptop, desktop, or tablet computer. The contactless card 305 may also include processing circuitry, antenna and other components not shown in FIG. 3. These components may be located behind the contact pad or elsewhere on the substrate. The contactless card 305 may also include a magnetic strip or tape, which may be located on the back of the card (not shown in FIG. 3).

According to one aspect, a contactless card 305 may be in wireless communication, for example, NFC, with one or more client devices 125. For example, contactless card 305 may comprise one or more chips, such as a radio frequency identification chip, configured to communicate via NFC or other short-range protocols. In other embodiments, contactless card 305 may communicate with client devices 410 through other means including, but not limited to, Bluetooth, satellite, and/or WiFi. As described in the '119 application, contactless card 305 may be configured to communicate with one of a client device 125 through NFC when the contactless card 305 is within range of the respective client device. As will be described in more detail below, the contactless card 305 may generate a cryptogram for use by the service provider to authenticate the client device.

The contactless card 305 may be used to generate a message authentication code (MAC) cryptogram which may function as a digital signature for purposes of verification. Other digital signature algorithms, such as public key asymmetric algorithms, e.g., the Digital Signature Algorithm and the RSA algorithm, or zero knowledge protocols, may be used to perform this verification.

More specifically, the contactless card 305 may be used to generate a session key. The session key may be received via the communication between the contactless card 305 and the client device 125 and act as a private key as described with respect to FIG. 1. In embodiments, this process may be an alternative to the generation of or storage of a private key local to the client device 125 as described with respect to FIG. 1.

In embodiments, the contactless card 305 may be used to pass an identifier to the client device 125. An identifier could be a counter, for example. In various embodiments, a private key associated with the client device 125 may be diversified using the counter and/or used to encrypt the identifier from the contactless card 305 as part of an encrypted identifying payload.

The client device 125 may send a message, for example, message 140. In embodiments, the message may be appended to a call data stream. The message may comprise an encrypted identifier payload associated with the client and/or client device 125. The identifier payload may comprise audio data, for example, a voice message. The message may further comprise at least one phone number, for example, as found in message 140.

In embodiments, the audio data may be recorded from a human voice, for example, from the client or from a service provider employee. In some embodiments, the audio data may comprise a custom voice message. In other embodiments, the audio data may be generated by a computer. In such embodiments, the audio data may be generated in response to a computer device interpretation of the text and/or numerical data, for example, by a text-to-speech application or program. Interpretation of text and/or numerical data may be performed locally to the client device 125 or on another network-enabled device. The data interpreted may comprise identifying information of the client and/or client device. Such information may be stored in memory accessible to the client device 125, for example, local to the client device, local to the contactless card, or accessible via a network connection. For example, information for a particular client may be found in a database in association with the phone number of the client device from which the message was sent. In some embodiments, the information may comprise dynamic information, such as a counter.

The payload may comprise further information including at least one identifier, in some embodiments. Such an identifier may comprise a counter from the contactless card 305, for example, as described in more detail herein and in the '119 application.

In embodiments, a network 315 may include a system enabled with interactive voice response (IVR). The IVR system may receive and decrypt the encrypted identifying payload sent by the client device 125. Decryption may take place by methods necessary, for example, by methods described in the '119 application or by methods described with respect to FIG. 1.

The identifier of the decrypted payload, for example, a counter, may be compared to an expected identifier associated with the client device from which the message was sent. In embodiments, the expected identifier may be associated with the client device by reference of a phone number associated with that client device. In embodiments, the expected identifier may be updated independently of the contents of incoming communications from the associated device. For example, a counter may be increased upon reception of a communication from the client device, but regardless of the contents of the messages received from the client device. In another example, a counter may be increased for each message received from the client device when a message contains a certain type of information. The comparison of the identifier of the decrypted payload to the expected identifier may be made by the IVR system, by another network-enabled device, by an application thereon, or another capable processor. Embodiments are not limited in this manner.

The matching of the identifier of the decrypted payload with the expected identifier may determine a first-factor authentication match. This authentication adds a layer of security farther than symmetric key or asymmetric key authentication alone by requiring not only successful decryption, but also matching of an identifier known only by the client device 125 and the memory in which the expected identifier is stored. For example, a counter value of a number X matched from the decrypted payload to an expected value may indicate not only that the payload had been able to be properly decrypted, but that the sending client device had the same record of the number X past communications with the server as the record of the server.

In embodiments, the IVR system may perform second-factor authentication using the audio data included in the identifying payload. In particular, the IVR system may interpret the audio data included in the identifying payload. In some embodiments, the audio data of the decrypted payload may be interpreted by a speech transcription program, such as a speech-to-text application. In some embodiments, the audio data may be analyzed for characteristics of the audio data itself. In embodiments, attributes such as voice message attributes may be identified from the audio data. Voice message attributes may include recognized words, human speech vs. computer-generated speech, voice characteristics such as tone, language, accent, cadence, background noise, volume, and other characteristics recognizable in audio data by a computer. Such attributes may be identified using methods known in the art of language processing, for example, keyword identification or recognition in accordance with a model trained by one or more machine learning algorithms, neural networks, or another training method. In some embodiments, at least one confidence level may be calculated according to the likelihood that the audio data contains at least one attribute.

The interpreted audio data may, in embodiments, be received by a service provider 320. The service provider 320 may include a private enterprise network 350, an authentication server 360, and a database 330. In embodiments, aspects of analysis of audio data may take place on the enterprise network 350 as opposed to the public network 315. In cases where analysis is performed as described above on network 315, identified attributes of the audio data may be sent to the enterprise network.

An authentication server 360 may compare identified attributes of the audio data from the decrypted payload to expected attributes of audio data from a particular client and/or client device 125. Such attributes may be stored in association with a client and/or client device in the database 330. For example, a custom voice message from the decrypted payload may be compared to a previously known custom voice message associated with the client device 125 in the database 330. In some embodiments, a binary analysis of the matching of attributes may be used. In other embodiments, attributes may be matched according to a confidence level within a certain range. Such a confidence level may be calculated by one or more machine learning methods, keyword identification methods, and/or other methods known in the art, for example. Based upon the comparison of the identified attributes to the expected attributes of the audio data, the authentication server 360 may or may not be able to establish a second factor authentication match. As such a second-factor authentication match may be based on information and/or audio data that is unique to the expected user of the client device 125, the authentication may provide confidence that the actual user of the client device 125 is the expected user, rather than an imposter.

In some embodiments, the IVR system may selectively establish a connection between the first client device 125 and the second client device 130 based on the results of the first and/or second factor authentication match. In some embodiments, the authentication server 360 may communicate to the IVR system the results of the first and/or second factor authentication match. In some embodiments, the authentication server 360 may further communicate instructions to connect or to not connect the first client device 125 and the second client device 130 based on the result of one or more factor authentication matches. In other embodiments, the PSTN or IVR system on network 315 may receive the results of the first and/or second authentication match and determine whether or not to connect the first client device 125 and the second client device 130 for communication based on the results of the one or more factor authentication matches. In some embodiments, the IVR system may be used to limit access of the first client device 125 to the second client device 130 based upon the first client device 125 being authenticated as one of at least one known validated callers. For example, such validated callers may be known and/or marked in the system as making problematic unsolicited calls.

Figure 4:
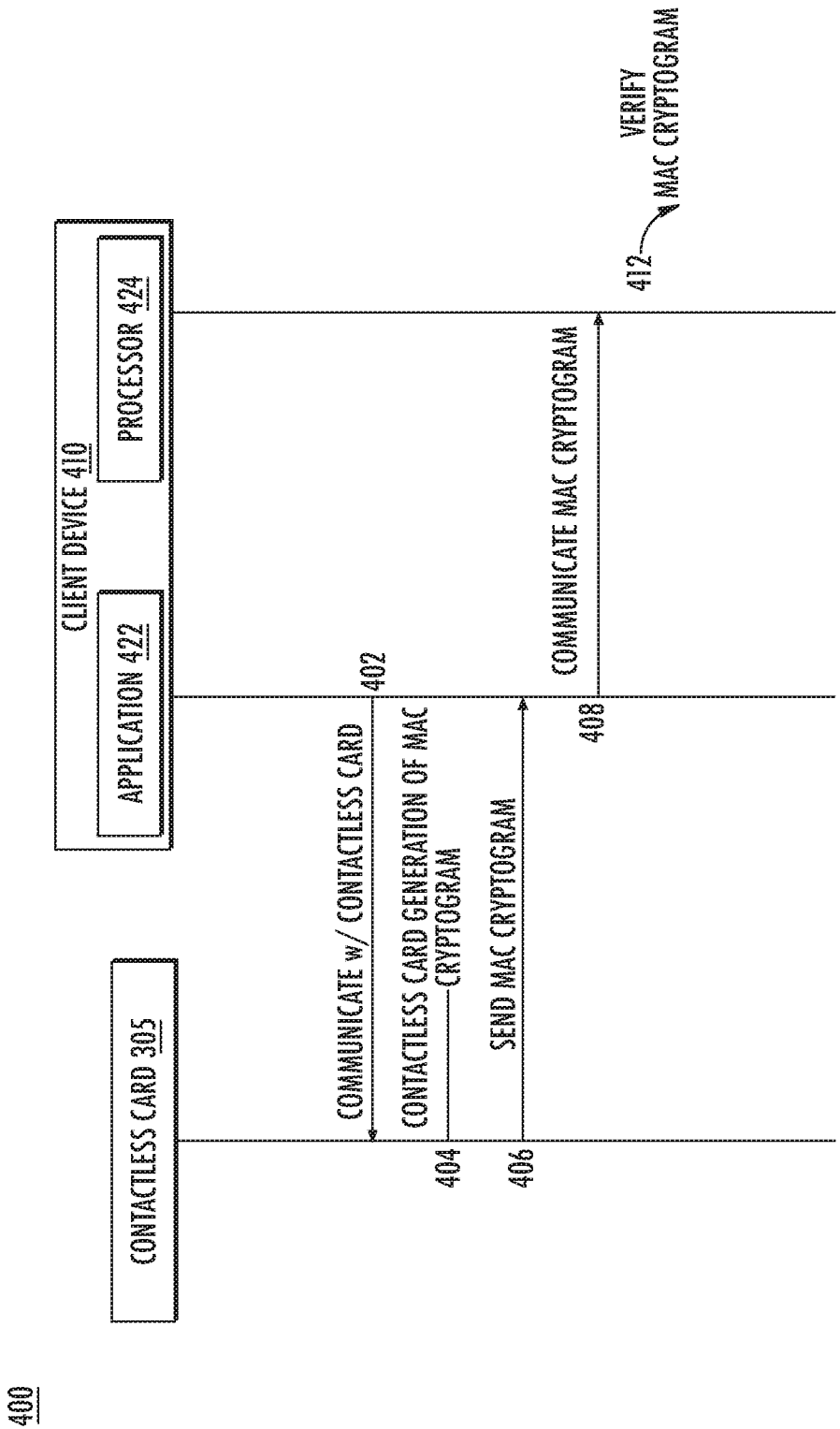
FIG. 4 is a diagram illustrating a sequence for providing authenticated access according to an example embodiment.

FIG. 4 is a timing diagram illustrating an example sequence for providing authenticated access according to one or more embodiments of the present disclosure. System 400 may comprise contactless card 305 and client device 410, which may include an application 422 and processor 424. Embodiments are not limited in this manner.

At step 402, the application 422 communicates with the contactless card 305 (e.g., after being brought near the contactless card 305). Communication between the application 422 and the contactless card 305 may involve the contactless card 305 being sufficiently close to a card reader (not shown) of the client device 410 to enable NFC data transfer between the application 422 and the contactless card 305.

At step 404, after communication has been established between client device 410 and contactless card 305, the contactless card 305 generates a MAC cryptogram. In some examples, this may occur when the contactless card 305 is read by the application 422. In particular, this may occur upon a read, such as an NFC read, of a near field data exchange (NDEF) tag, which may be created in accordance with the NFC Data Exchange Format. For example, a reader, such as application 422, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 305 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 422 may be configured to transmit a request to contactless card 305, the request comprising an instruction to generate a MAC cryptogram.

At step 406, the contactless card 305 sends the MAC cryptogram to the application 422. In some examples, the transmission of the MAC cryptogram occurs via NFC, however, the present disclosure is not limited thereto. In other examples, this communication may occur via Bluetooth, Wi-Fi, or other means of wireless data communication.

At step 408, the application 422 communicates the MAC cryptogram to the processor 424.

At step 412, the processor 424 verifies the MAC cryptogram pursuant to an instruction from the application 422. For example, the MAC cryptogram may be verified, as explained below.

In some examples, verifying the MAC cryptogram may be performed by a device other than client device 410, such as a service provider 320 in data communication with the client device 410. For example, processor 424 may output the MAC cryptogram for transmission to service provider 320, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

More specifically, according to one aspect, a contactless card 305 may be used in conjunction with first authentication credentials provided to a service provider, such as service provider 320, to authenticate a communication from a client device 410, for example, a call. The use of the contactless card as a second factor of authentication enables the association of a particular device/phone number with a specific individual (i.e., the owner of the card), thereby removing the ability for a malicious third party to spoof, i.e., impersonate, the client. According to another aspect of the invention, authentication communication protocols described herein identify or use specific communication channels for call handling, thereby reducing the opportunity for client impersonation.

The security factor authentication may comprise a plurality of processes. In some embodiments, a first authentication process may comprise logging in and validating a user via one or more applications executing on a device. A second authentication process may operate following successful login and validation to cause a user to engage in one or more behaviors associated with one or more contactless cards. In effect, the security factor authentication process comprises a multi-factor authentication process that may include both securely proving identity of the user and encouraging the user to engage in one or more types of behaviors, including but not limited to one or more tap gestures, associated with the contactless card. In some examples, the one or more tap gestures may comprise a tap of the contactless card by the user to a device. In some examples, the device may comprise a mobile device, a terminal, a tablet, or any other device configured to process a received tap gesture.

For example, to provide a first layer of authentication, a client may access an application operating on the client device. In other examples, the client may access the website of the service provider by linking to a service provider web page using an internet browser application executing on the client device. The browser is a software application such as Google® Chrome®, Internet Explorer®, Safari®, etc., and includes programming code for translating Hypertext Markup Language (HTML) web pages of the service provider application to a format suitable for to a client operating the client device.

As part of accessing the application or the service provider website, the service provider may request first authorization information, including password information, answers to pre-stored queries, biometric information, an image, or other mechanism of verifying that a user of the client device is authorized to access content and services, including accounts, managed by the service provider. Furthermore, this level of authentication provides confidence that the user of the client device 125 is the expected client. In other words, while the methods described above may be particularly helpful for at least authenticating that a communication is coming from an authenticated device, these steps may further authenticate that a communication is coming from an authenticated user of said device.

According to one aspect, the contactless card 305 may be used to provide a second authentication for a user of a client device. In one embodiment, and as described in more detail below, the contactless card includes a key, a counter, and cryptographic processing functionality that may be used to generate a cryptogram that may be used to validate a user of a client device. The counter advantageously reflects previous behaviors of the holder of the card. For example, the counter may reflect the number of times that the user has previously communicated with a particular party, information which is virtually impossible for a malicious third party to garner accurately.

A further level of authentication may be made by using the contactless card 305, for example, by communicatively coupling the card 305 to one of the client devices 410 by tapping or otherwise, as mentioned above. In some embodiments, this constitutes the second authentication. In other embodiments, the second authentication is continued with further analysis of an identifying payload, for example, as described with respect to FIG. 3.

Following the second authentication, and as described in more detail herein, data may be returned to the client device. For example, the data may include data allowing the client to initiate a communication link with the second client device or information about the success or failure of the authentication attempt.

It should be noted that although in the above description the first authentication is described as using personal, biometric, questions or other authentication information, it is recognized that in some examples, a client application executing on a device may respond to a tap of a contactless card to initially activate or launch the application of the device. In such examples, both the first and second authentication processes use the key/counter contactless card authentication process described in more detail below.

In some embodiments, if the client-side application is not installed on a client device, a tap of the contactless card proximate the card reader may initiate a download of the application, (such as navigation to a download page of the application). Subsequent to installation, a tap of the contactless card may activate or launch the application, and then initiate, for example via the application or other back-end communication), activation of the contactless card. In some examples, the one or more applications may be configured to determine that it was launched via one or more tap gestures of the contactless card, such that a launch occurred at 3:51 PM, that a transaction was processed or took place at 3:56 PM, in order to verify the identity of the user.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about the individual. The secondary information may comprise personally identifiable information about the user. In some examples, the secondary information may be stored within the contactless card.

Figure 5:
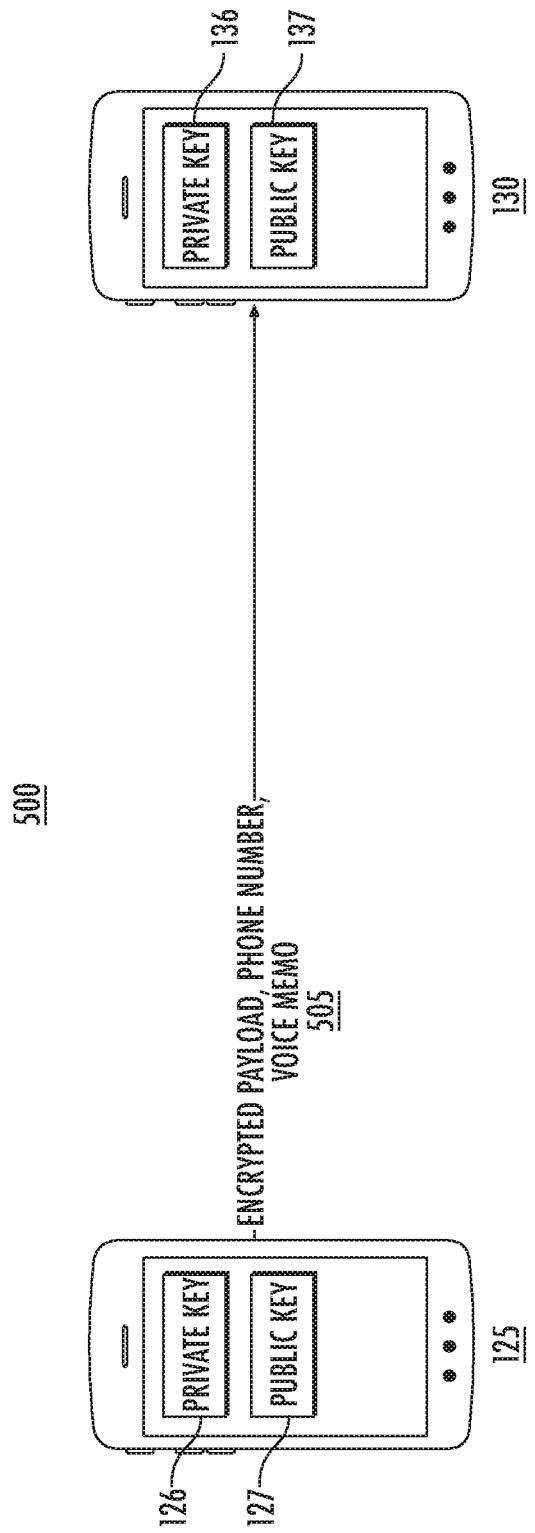
FIG. 5 is a block diagram is a second block diagram of a data transmission system configured to authenticate user calls according to an example embodiment.

FIG. 5 illustrates an exemplary system 500 in which an authenticated call may be made. System 500 comprises two or more client devices 125 and 130. As illustrated, a single client device 125 is the device used to initiate the communication and a single client device 130 is the device used to receive the communication. However, it will be readily understood that communication could be transmitted from client device 130 to client device 125 and/or that each client device as illustrated may comprise a plurality of client devices, such as in a group call. Embodiments are not limited in this manner.

Client device 125 may be associated with a private key 126 and a public key 127. Client device 130 may be associated with a private key 136 and a public key 137. In embodiments in which at least one of client device 125 or client device 130 represents a plurality of client devices, each client device may be associated with a private key and a public key.

For each client device, the private key and the public key may be related so that one decrypts data encrypted by the other. In some embodiments, the private key and the public key for a device may be the same, enabling symmetric key encryption. In other embodiments, the private key and the public key may be different, enabling asymmetric key encryption. Keys may be persistent or dynamic. In some embodiments, a private key may be a session key diversified by use of dynamic information local to the client device or provided by an external object or device, such as a contactless card, as described above.

In various embodiments, client device 125 may initiate a communication with client device 130, for example, a call data stream. A message 505 may be appended to the communication. The message 505 may comprise an encrypted payload, at least one phone number, the at least one phone number comprising a phone number associated with recipient client device 130, and a voice memo. In embodiments, the voice memo may be customizable by the owner of the sending client device 125, for example, a phrase or greeting. In some embodiments, the message 505 may further include the public key 127 of client device 125.

The encrypted payload may be encrypted using the private key of client device 125. The encrypted payload may comprise at least one identifier. In some cases, the voice memo may be included in the encrypted payload.

The second client device 130 may have access to the public key 127 of the first client device 125 in association with the phone number or other identifying data for the client device 125. For example, the public key 127 of the first client device 125 may be received with the message 505, stored locally to memory of the client device 130 after a previous communication between the two devices, or available via another memory or database, such as an internet-linked database. Furthermore, the second client device 130 may have access to an expected identifier in association with the client device 125. For example, the same database may be used to store at least one client device 125, an associated public key, and an expected identifier associated with that client device 125.

The message 505 may be received by the client device 130. The client device 130 may retrieve the public key 127 associated with client device 125 and use the public key 127 to decrypt the encrypted payload of the message 505.

Failure of decryption of the payload with the public key 127 may indicate potential fraudulent behavior. As a result, the communication connection supposedly coming from client device 125 may be denied. In some embodiments, feedback may be provided to the user of client device 130, to a service provider, or to a third party, for example, law enforcement.

In some embodiments, the voice memo of message 505 may be presented to the user of client device 130, for example, via a user interface by playing the voice memo audio data to the user of client device 130 when they answer the incoming call. The user interface may be a part of an application on the client device 130. In some embodiments, the voice memo of message 505 may only be presented to the user based upon a successful first authentication of the identifier of the encrypted payload.

The client device 130 may then receive feedback from its user if they do or do not recognize the voice memo from the user of the first client device 125. For example, feedback may be received via a user interface. This verification of recognition of the voice memo from the first client by the second client provides a further layer of authentication. In some embodiments, the client device 130 may receive instructions from the user via the user interface directing continuation or denial of the communication connection between the client devices 125 and 130.

Based on the feedback concerning voice memo recognition received from the user, the client device 130 may selectively establish a connection between the client device 125 and the client device 130. In some embodiments, based on the feedback, the client device 130 may save the public key 127 of the client device 125 to local memory or add the client device 125 to a list of recognized and/or trusted devices.

In some embodiments, continued communication between recognized and/or trusted devices may take place with streamlined authentication methods. For example, only a first level of authentication may be required.

Figure 6:
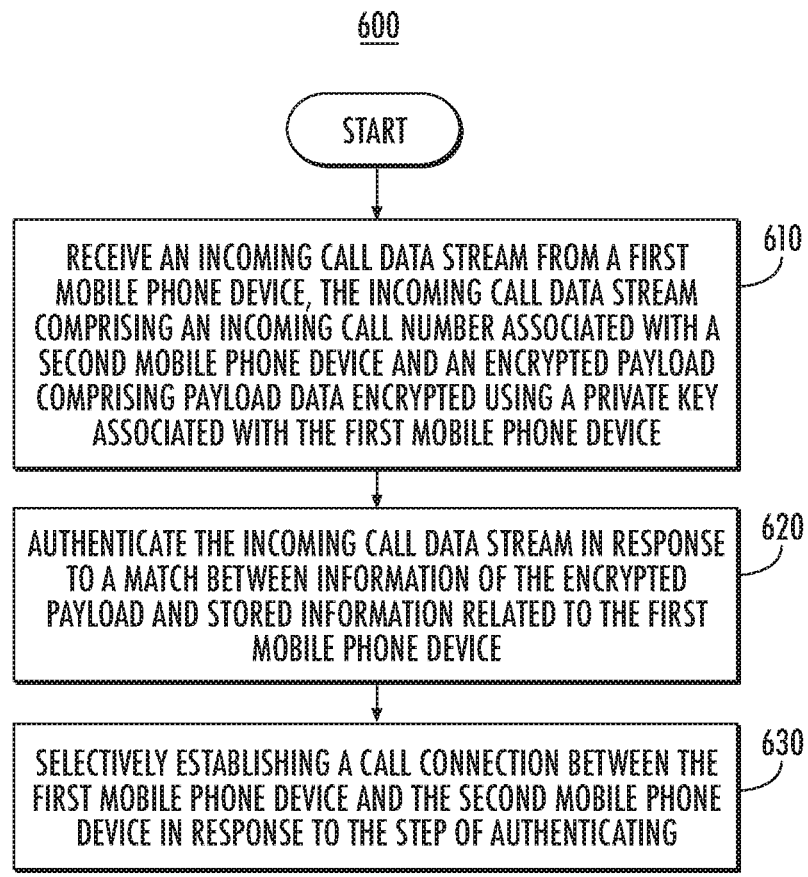
FIG. 6 is a first logic flow provided to describe exemplary steps that may be performed during one embodiment of a call authentication process.

FIG. 6 is a logic flow 600 illustrating a method for selectively connecting a first client device and a second client device for communication based upon results of authentication. Specifically, FIG. 6 illustrates an example in which the first and second client devices are both mobile phone devices and the communication is a call data stream. Embodiments are not limited herein.

In step 610, an incoming call data stream is received from a first mobile phone device. The incoming call stream comprises a phone number associated with a second mobile phone device and an encrypted payload. The encrypted payload is encrypted using a private key associated with the first mobile device. In embodiments, the encrypted payload may be appended to the incoming call data stream. The payload data may comprise information pertaining to the first client and/or client device.

In step 620, the incoming call data stream may be authenticated in response to a match between the information of the encrypted payload and stored information related to the first mobile phone device. In various embodiments, the match between the information of the encrypted payload and stored information related to the first mobile phone device may be judged by successful decryption of the payload. For example, a payload may have been encrypted with a public key diversified using a counter. In this example, successful decryption of the payload with a public key diversified by an independently maintained counter may indicate proper authentication.

In step 630, the system may establish a call connection between the first mobile phone device and the second mobile phone device in response to the step of authenticating.

In some embodiments, a system's failure to properly authenticate a call may prompt denial of the call or other method of dismissal of the call. In some embodiments, a first client device and/or second client device may be notified of the failed attempt and provided details of the attempt, such as the phone number of the caller and/or recipient. In some embodiments, a recipient may be prompted via the user interface of the second client device to add the phone number of the calling first client device to a list of numbers to be blocked. In various embodiments, the system may provide a service provider or third party, for example, law enforcement, with information relating to the unauthenticated call.

In some embodiments, a system's successful authentication of a call may prompt establishment of a connection between the first mobile device and the second mobile device. In various embodiments, information about the first mobile device may be saved to and/or by the second mobile device identifying the first mobile device as having been engaged with via an authenticated call. Such registration may be referenced in subsequent communications between the two client devices to efficiently check probable authenticity of the subsequent communications based on the authentication of a prior communication.

In some embodiments, a call connection may be made between a first and second mobile phone device in response to the step of authenticating, and the results of the step of authenticating may be indicated to the recipient, for example, via a user interface of the second client device. For example, a call connection may be made despite authentication failure, but a warning may be communicated to the recipient via the user interface of their mobile phone that the call is unauthenticated. In a further example, a call connection may be made in response to authentication success, with a verification being communicated to the recipient via the user interface of their mobile phone that the call has been authenticated.

Figure 7:
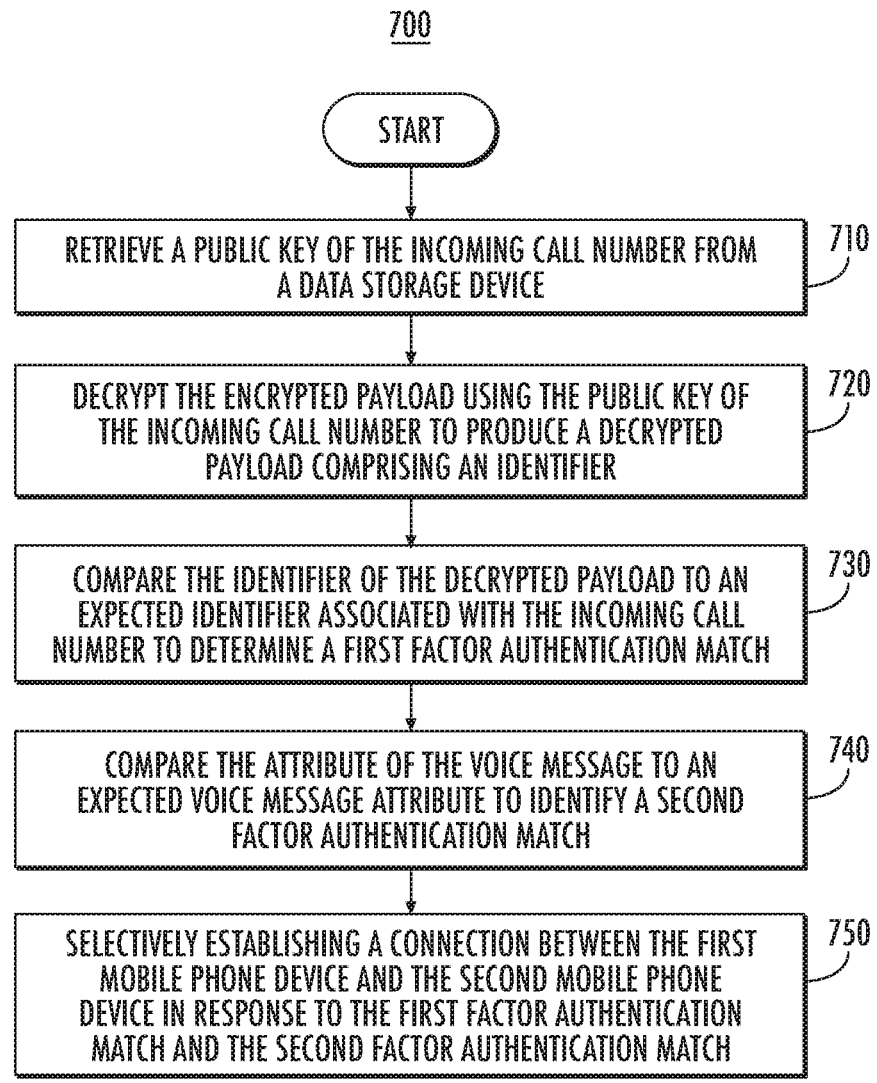
FIG. 7 is a second logic flow provided to describe exemplary steps that may be performed during one embodiment of a call authentication process.

FIG. 7 is a logic flow 700 illustrating a method for selectively connecting a first client device and a second client device for communication based upon results of a multifactor authentication. Specifically, FIG. 7 illustrates an example in which the first and second client devices are both mobile phone devices and the communication is a call data stream. Embodiments are not limited in this manner.

Step 710 discloses the retrieval of an incoming call number's public key from a data storage device. In some embodiments, the data storage device may be local to the second client device. In other embodiments, the data storage device may be an external memory, such as that discussed above with reference to authentication router 120 or database 330, for example.

Step 720 discloses the decryption of the encrypted payload using the incoming call number's public key, retrieved in step 710, to produce a decrypted payload comprising an identifier. The encrypted payload may be received with the incoming call number, for example, as in message 140. The identifier may be related to the sending client and/or first client device.

Step 730 discloses comparison of the decrypted payload's identifier to an expected identifier associated with the incoming call number to determine a first factor authentication match. In various embodiments, the expected identifier associated with the incoming call number may be retrieved from memory, which may be the same data storage device referenced in step 710 or a separate data storage device.

Step 740 discloses comparison of the attribute of a voice message to an expected voice message attribute to identify a second factor authentication match. The voice message may be received in association with or as part of the encrypted payload.

Step 750 discloses selective establishment of a connection between the first mobile phone device and the second mobile phone device in response to the first factor authentication and the second factor authentication match.

In some embodiments, a system's failure to properly authenticate a call via the first factor and/or the second factor authentication matches may prompt denial of the call, dropping of the call, or other method of dismissal of the call. In some embodiments, a first client device and/or second client device may be notified of the failed attempt and provided details of the attempt, such as the phone number of the caller and/or recipient. In some embodiments, a recipient may be prompted via the user interface of the second client device to add the phone number of the calling first client device to a list of numbers to be blocked. In various embodiments, the system may provide a service provider or third party, for example, law enforcement, with information relating to the unauthenticated call. Such information may specify which factor of authentication failed and include further details of the attempt.

In some embodiments, a system's successful authentication of a call via the first factor and/or the second factor authentication matches may prompt establishment of a connection between the first mobile device and the second mobile device. In various embodiments, information about the first mobile device may be saved to and/or by the second mobile device identifying the first mobile device as having been engaged with via a multifactor authenticated call. Such registration may be referenced in subsequent communications between the two client devices to efficiently check probable authenticity of the subsequent communications based on the multifactor authentication of a prior communication.

In some embodiments, a call connection may be made between a first and second mobile phone device in response to the first factor and/or the second factor authentication matches, and the results of the step of authenticating may be indicated to the recipient, for example, via a user interface of the second client device. For example, a call connection may be made despite multifactor authentication failure, but a warning may be communicated to the recipient via the user interface of their mobile phone that the call is unauthenticated or only partially authenticated. In a further example, a call connection may be made in response to multifactor authentication success, with a verification being communicated to the recipient via the user interface of their mobile phone that the call has been authenticated via multifactor authentication.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various users or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The invention claimed is:

1. A computer-implemented method, comprising:
   detecting, by a first computing device, an initiation to establish a call communication connection with a second computing device;
   detecting, by the first computing device via an interface, a contactless card;
   establishing, by the first computing device, a communication connection with the contactless card over the interface;
   receiving, by the first computing device, an encrypted payload from the contactless card, the encrypted payload comprising an identifier and a Message Authentication Code (MAC) cryptogram, and wherein the MAC cryptogram is formed from a message and a dynamic key generated using a counter value incremented in response to reads of the contactless card;
   sending, by the first computing device, a call data stream to a server of a service provider system to establish the call communication connection, the call data stream comprising the encrypted payload and a call number;
   receiving, by the first computing device, an indication of the establishment of the call communication connection with the second computing device based on a successful authentication performed by the server utilizing the encrypted payload including the identifier; and
   establishing, by the first computing device, the call communication connection with the second computing device.

2. The computer-implemented method of claim 1, wherein the identifier comprises on one or more of password information, answers to pre-stored queries, biometric information, an image, or combination thereof.

3. The computer-implemented method of claim 1, wherein the identifier comprises audio data, and the audio data is unique to an expected user of the first computing device.

4. The computer-implemented method of claim 1, wherein the interface is an near-field communication (NFC) interface, and establishing the communication connection over the NFC interface is in accordance with an NFC protocol.

5. The computer-implemented method of claim 4, comprising sending an NFC read over the communication connection to request the encrypted payload and cause generation of a Message Authentication Code (MAC) cryptogram for the encrypted payload.

6. The computer-implemented method of claim 1, wherein the call number is associated with the second computing device to establish the call communication connection with the second computing device.

7. A computing device, comprising:
   an interface;
   a processor coupled to the interface;
   memory having program code stored thereon, the memory coupled with the interface and the processor, and the program code operable when executed upon by the processor to:
   detect an initiation to establish a call communication connection with a second computing device;
   detect, via the interface, a contactless card;
   establish a communication connection with the contactless card over the interface;
   receive an encrypted payload from the contactless card, the encrypted payload comprising an identifier and a Message Authentication Code (MAC) cryptogram, and wherein the MAC cryptogram is formed from a message and a dynamic key generated using a counter value incremented in response to reads of the contactless card;
   send a call data stream to a server of a service provider system to establish the call communication connection, the call data stream comprising the encrypted payload and a call number;
   receive an indication of the establishment of the call communication connection with the second computing device based on a successful authentication performed by the server utilizing the encrypted payload including the identifier; and
   establish the call communication connection with the second computing device.

8. The computing device of claim 7, wherein the identifier comprises on one or more of password information, answers to pre-stored queries, biometric information, an image, or combination thereof.

9. The computing device of claim 7, wherein the identifier comprises audio data, and the audio data is unique to an expected user of the computing device.

10. The computing device of claim 7, wherein the interface is an near-field communication (NFC) interface, and establishing the communication connection over the NFC interface is in accordance with an NFC protocol.

11. The computing device of claim 10, the processor to send an NFC read over the communication connection to request the encrypted payload and cause generation of a Message Authentication Code (MAC) cryptogram for the encrypted payload.

12. The computing device of claim 7, wherein the call number is associated with the second computing device to establish the call communication connection with the second computing device.

13. A non-transitory computer-readable medium storing instructions, the instructions configured to, when executed, cause one or more processors of a first computing device to:
  detect an initiation to establish a call communication connection with a second computing device;
  detect, via an interface, a contactless card;
  establish a communication connection with the contactless card over the interface;
  receive an encrypted payload from the contactless card, the encrypted payload comprising an identifier and a Message Authentication Code (MAC) cryptogram, and wherein the MAC cryptogram is formed from a message and a dynamic key generated using a counter value incremented in response to reads of the contactless card;
  send a call data stream to a server of a service provider system to establish the call communication connection, the call data stream comprising the encrypted payload and a call number;
  receive an indication of the establishment of the call communication connection with the second computing device based on a successful authentication performed by the server utilizing the encrypted payload including the identifier; and
  establish the call communication connection with the second computing device.

14. The non-transitory computer-readable medium of claim 13, wherein the identifier comprises on one or more of password information, answers to pre-stored queries, biometric information, an image, or combination thereof, and wherein the identifier comprises audio data, and the audio data is unique to an expected user of the first computing device.

15. The non-transitory computer-readable medium of claim 13, wherein the interface is an near-field communication (NFC) interface, and establishing the communication connection over the NFC interface is in accordance with an NFC protocol.

16. The non-transitory computer-readable medium of claim 15, the one or more processors to send an NFC read over the communication connection to request the encrypted payload and cause generation of a Message Authentication Code (MAC) cryptogram for the encrypted payload.

17. The non-transitory computer-readable medium of claim 13, wherein the call number is associated with the second computing device to establish the call communication connection with the second computing device.

* * * * *